March 6, 1962 R. C. MONTROSS 3,024,398
ELECTRONIC CIRCUIT
Filed Sept. 10, 1959 2 Sheets-Sheet 1
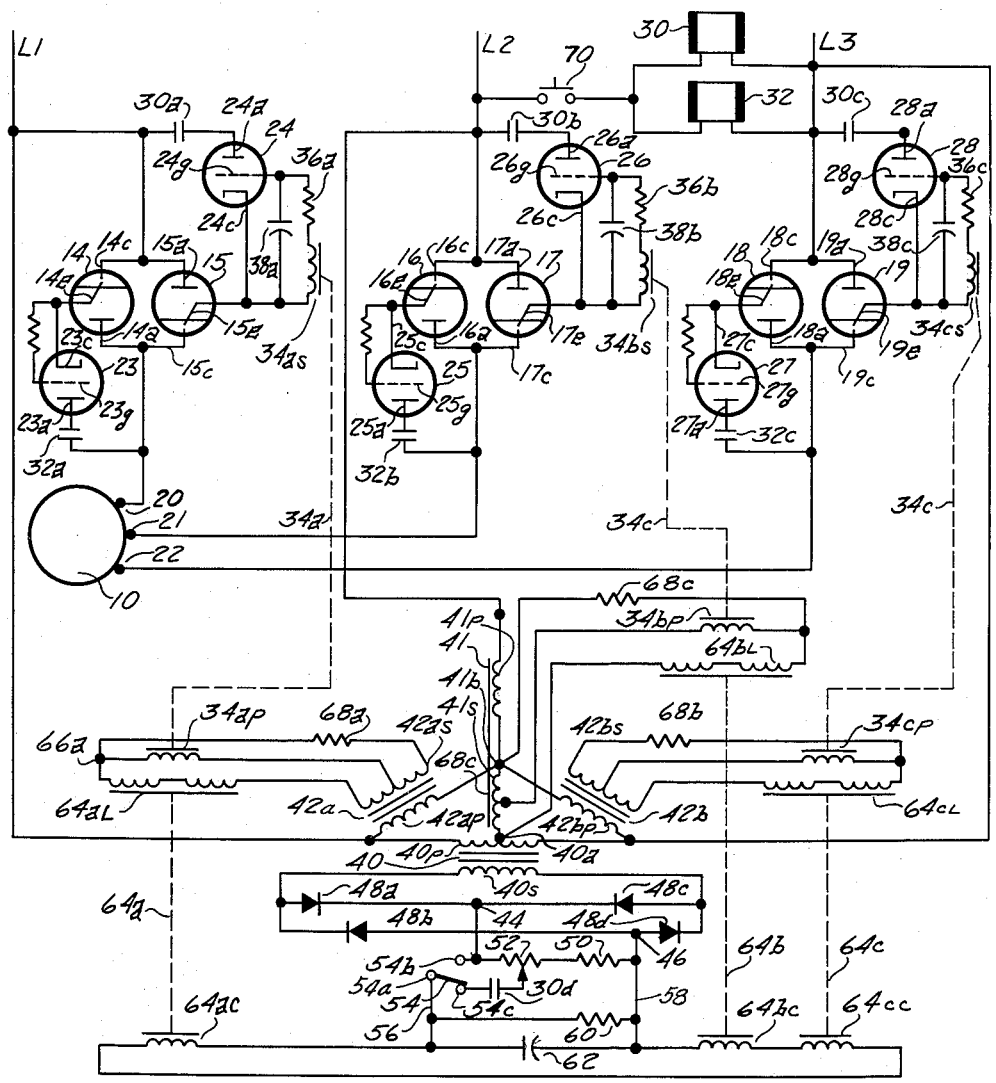
FIG. 1
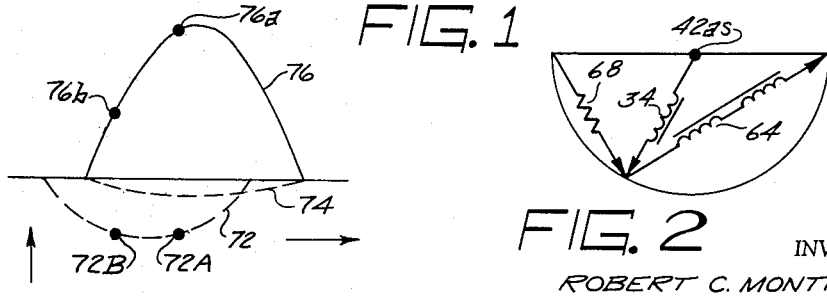
FIG. 3
FIG. 2
INVENTOR.
ROBERT C. MONTROSS
BY
William H. Schmeling

INVENTOR.
ROBERT C. MONTROSS

United States Patent Office 3,024,398
Patented Mar. 6, 1962

3,024,398
ELECTRONIC CIRCUIT
Robert C. Montross, Thiensville, Wis., assignor to Square D Company, Detroit, Mich., a corporation of Michigan
Filed Sept. 10, 1959, Ser. No. 839,207
20 Claims. (Cl. 318—227)

This invention relates to control circuits and is more particularly concerned with an improved circuit for controlling the operation of an alternating current motor.

In application Serial Number 590,484, filed June 11, 1956, and assigned by the inventors to the assignee of the present invention, a control circuit for an electric motor which is directly coupled to a large punch press is fully described. While the circuit described in the above mentioned application has proved to operate satisfactorily, it has been found that certain improvements and modifications which will be hereinafter described, when incorporated therein would overcome certain disadvantages which were observed therein.

The circuit shown and described in the application supra including phasing relays to assure correct phase rotation of the supply lines to the ignitron tubes, so conduction in the ignitron tubes would occur at the proper instant in the voltage wave of the three phase alternating current supply. It has been found that omission of the phasing relays from the system and inadvertent incorrect connection of the three phase supply lines to the ignitrons rendered the delayed firing circuit described in the application inoperative. The circuit according to the present invention eliminates the requirement of phasing relays but maintains operation of the delayed firing circuit for either sequence of phase rotation.

In the control circuit disclosed in the application previously mentioned, the current flow to the motor was reduced for each half cycle of the alternating current supply while the motor was accelerating during the initial motor starting period. This result was accomplished by delaying the ignition of the ignitrons controlling the flow of current to the motor and progressively decreasing the delay in firing of the ignitrons until the ignitrons fired whenever the voltages to their respective anodes was sufficiently positive to render the ignitrons conducting. The aforementioned control of the ignitrons was achieved through the agency of thyratron tubes having principal electrodes thereof connected between the anode and ignitor electrode of the ignitrons and having the potential between control electrode and cathode of the thyratron responsive to the potential across a capacitor which was charged through a variable resistance. Thus, a three phase alternating current system required the presence of three individually adjustable resistances. It is to be appreciated precise adjustment of three individual circuits to obtain proper equalization thereof is very difficult. The circuitry according to the present invention overcomes this difficulty.

Further, when capacitive control was utilized, the D.C. potential on the grid to cathode was gradually increased while the phase of the voltage curve remained constant. While this control has been found satisfactory and is incorporated into one of the embodiments of the invention described hereinafter, in the circuit according to another embodiment of the present invention, the phase angle of the voltage between the grid to cathode relative to the voltage between the anode to cathode is varied. This will provide certain advantages which will be hereinafter described.

It is an object therefore of the present invention to provide an improved motor control circuit incorporating the features and advantages above described.

Another object of the present invention is to eliminate the requirement for phasing relays in a control circuit of the type herein described so that controlled delayed firing of the ignitron tubes over the predetermined time interval during the initial energization of the motor which is controlled by the control circuit will remain operative regardless of the sequence of the voltages which are impressed on the controller by a three phase supply.

A further object of the present invention is to control the current flow to a three phase motor from a three phase source with a plurality of banks of ignitrons and to control the instants on the voltage wave of the source at which the ignitrons are rendered conductive with a control means which includes a single adjusting element which will vary the firing of the ignitrons in each of said banks according to a predetermined pattern during the initial energization of the motor from the supply source.

In carrying out the above object it is another object of the present invention to utilize transformers having a Scott connection for obtaining an electrical voltage neutral for the control circuits as herein described to cause the control circuit to be insensitive to the phase rotation of the voltages of the three phase supply.

In carrying out the aforementioned objects it is another object of the present invention to provide a stepless variation in firing of the ignitrons over said predetermined pattern.

These and further objects and features of the invention will be readily apparent to those skilled in the art from the following specification and appending drawings illustrating certain preferred embodiments in which:

FIG. 1 shows a circuit diagram of the controller incorporating the features according to the present invention.

FIG. 2 is a modified vector circle diagram illustrating the effect of the components shown in FIG. 1 which provide a voltage phase shift network.

FIG. 3 illustrates the advantages achieved by the tube firing circuit according to the present invention over the circuitry heretofore employed.

Figure 4:
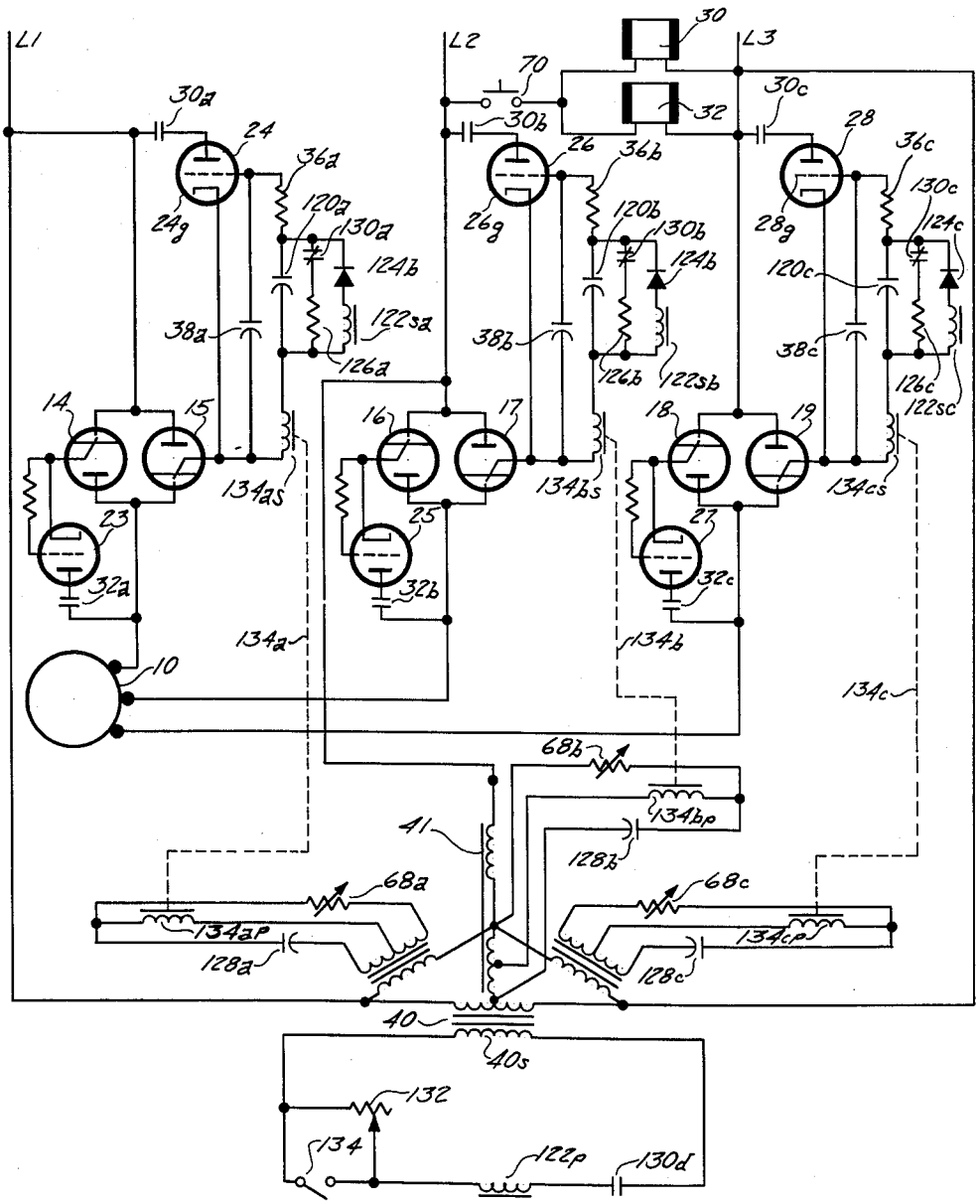
FIG. 4 shows a circuit diagram of a modification of the present invention wherein the delayed firing is accomplished by a capacitive circuit.

In the drawings, and in FIG. 1 particularly, the electronic contactor shown is arranged to connect a polyphase alternating current source, not shown to an RL counter E.M.F. load. In the preferred embodiment, the polyphase source is of the three phase type and is connected to supply lines L1, L2 and L3. The load preferably consists of an electric alternating current motor 10 of the wound rotor or squirrel cage types or the like.

The electronic contactor basically comprises three banks of inverse parallel connected gaseous discharge devices having a high capacity and preferably of the mercury pool cathode type known as ignitrons. The drawing illustrates the ignitrons as connected in inverse parallel relation for symmetrically switching the source to the motor 10. The ignitrons are designated by numerals 14, 15, 16, 17, 18 and 19. The ignitrons 14 and 15 are connected back to back or in inverse parallel between line L1 and a terminal 20 of the motor 10. The ignitrons 16 and 17 similarly are connected between line L2 and a terminal 21 of the motor 10 and the ignitrons 18 and 19 are connected between line L3 and a motor terminal 22. Each of the ignitrons have a firing circuit connected therewith which firing circuits have a thyratron included therein. The firing circuits will hereinafter be set forth. The thyratrons have numerals 23, 24, 25, 26, 27 and 28 assigned thereto. The firing of ignitron 14 is controlled by the firing circuit associated with thyratron 23. Similarly, the firing of ignitrons 15, 16, 17, 18 and 19 is controlled by the respective firing circuits associated with thyratrons 24, 25, 26, 27 and 28.

The firing circuit for ignitron 15 with its associated thyratron 24 is identical with the firing circuits for ignitrons 17 and 19 and therefore only the firing circuit for ignitron 15 will be hereinafter described. Likewise, the firing circuit for ignitron 14 with its associated thyratron 23 is identical with the firing circuits for ignitrons 16 and 18 and therefore only the firing circuit for ignitron 14 will be hereinafter described.

The thyratron 24 has an anode 24a connected through a pair of normally open switch contacts 30a to supply line L2. Similarly, ignitron 15 has an anode electrode 15a connected and ignitron 14a has a cathode electrode 14c connected to line L1. The anodes 26a and 28a of thyratrons 26 and 28 are connected through normally open switch contacts 30b and 30c to lines L2 and L3 respectively while the cathode 16c and anode 17a electrodes of ignitrons 16 and 17 respectively are connected to L2 and the cathode 18c and anode 19a of ignitrons 18 and 19 respectively are connected to L3.

The thyratron 24 has a cathode electrode 24c connected to an exciter electrode 15e of ignitron 15 while the thyratron 23 has a cathode electrode 23c connected to an exciter electrode 14e of ignitron 14. Similarly, the cathodes 25c, 26c, 27c and 28c of thyratrons 25, 26, 27 and 28 are connected to the exciter electrodes 16e, 17e, 18e, and 19e of ignitrons 16, 17, 18 and 19 respectively.

The thyratron 23 has an anode 23a connected through a pair of normally open switch contacts 32a to the motor terminal 20. Similarly, the anodes 25a and 27a of thyratrons 25 and 27 are connected through normally open switch contacts 32b and 32c to the motor terminals 21 and 22 respectively.

The thyratrons 23—28 each have a control electrode which is designated as shown with a letter "g" following the numeral identifying the respective thyratron.

The grid 24g of thyratron 24 is connected through a secondary winding 34as of a transformer 34a to the cathode 24c and the exciter electrode 15e. The primary circuit 34ap of the transformer 34a will be hereinafter explained. Similarly, the grids 26g and 28g of the thyratrons 26 and 28 are respectively connected through the respective secondary windings 34bs and 34cs of transformers 34b and 34c to the cathode 26c and exciter electrode 17e and cathode 28c and exciter electrode 19e respectively. The circuit to the primary winding 34bp and 34cp of transformers 34b and 34c respectively will be hereinafter explained. The transformers 34a, 34b, and 34c are shown as dotted lines which connect their respective primary and secondary windings.

A filter network consisting of a resistor 36a connected in series with secondary winding 34as and a capacitor 38a connected in parallel with resistor 36a and winding 34as between the grid 24g and the cathode 24c serves to filter noise voltages and voltage transients which would otherwise be impressed between the grid 24g and cathode 24c by secondary winding 34as. The secondary windings 34bs and 34cs are provided with similar filter networks consisting of series connected resistors 36b and 36c respectively and parallel connected capacitors 38b and 38c.

The circuit according to the present invention also includes two transformers 40 and 41. The transformer 40 has a secondary winding 40s and a primary 40p which is center tapped at 40a. For purposes of economy the transformer 41 may also be considered to have a primary winding 41p and a secondary winding 41s which also is center tapped. The primary winding 41p and the secondary winding 41s are connected in series at a junction 41b and the free end terminal of the secondary winding 41s is connected to the center tap 40a of the primary winding 41p. When these connections are made, it will be observed that the winding 41p and the winding 41s act as a composite primary winding which has a tap at 41b, and which has one of its end terminals connected to the center tap 40a. The remaining free end of the composite primary winding is connected to line L2. When the end terminals of primary winding 40p are connected as shown to lines L1 and L3 it will be observed that the primary windings are connected as a classic Scott connected transformer wherein the primary winding 40p is the main transformer winding and the primary winding 41p and the secondary winding 41s cooperate to provide the second primary winding known as the teaser winding of the Scott connected transformer winding. The second or teaser primary winding has a tap at 41b formed by the series connection of the two windings 41p and 41s and the center tap on the secondary winding 41s provides a second tap on the composite teaser primary winding.

It is well known that the induced voltage in a transformer is a function of the number of turns of windings, the flux density of the iron forming the magnetic path in the transformer, and the frequency of the voltage impressed on the transformer windings. If the primary and secondary windings 41p and 41s are properly selected, the voltage rating of the primary 41p winding can be made to be twice the voltage rating of the secondary winding 41s. Thus, when the primary and secondary windings 41p and 41s are connected in series with heed to proper polarity, the composite primary winding has a 1/3 to 2/3 ratio between the ends and their junction 41b. The junction point 41b is an electrical neutral for the three phase voltages present on lines L1, L2 and L3. It is recognized that transformer 41 could be replaced with a single reactor winding which is suitably tapped and connected to accomplish the same result as series connected primary and secondary winding of a transformer. However, if selection is made so the primary and secondary rating of transformers 41, 42a and 42b were identical, economy of components as well as satisfactory performance is achieved.

Connected between the tap 41b and line L1 is a primary winding 42ap of a transformer 42a. Similarly connected between the tap 41b and line L3 is a secondary winding 42bp of a transformer 42b.

The transformer 40 has a secondary winding 40s which in turn is connected to a full wave rectifier to impress a direct current voltage across a pair of terminals 44 and 46. The full wave rectifier preferably consists of conventional rectifying diodes 48a, 48b, 48c and 48d which are connected in a conventional fashion.

A resistor 50 and a potentiometer resistor 52 are connected in a series circuit across the terminals 44 and 46. A double throw switch 54 has a common terminal 54a and a pair of alternately engageable terminals 54b and 54c. The terminal 54b is connected to terminal 44 and the other terminal 54c is connected through a pair of normally open switch contacts 30d to a movable tap of the potentiometer resistor 52. A lead 56 is connected to the terminal 54a. Thus the lead 56 will be connected through the switch contacts 30d and a portion of the potentiometer 52 to terminal 44 when the switch 54 completes the circuit to terminal 54c and the switch contacts 30d are closed. When the switch 54 is moved to its alternate position to complete a circuit through terminal 54b the lead 56 will be directly connected to terminal 44. When the switch 54 is in this latter position, the delayed firing of the ignitrons, which will be later described, will be inoperative. A lead 58 is directly connected to terminal 46. A resistor 60, and a capacitor 62 are connected in parallel across leads 56 and 58. Also connected across the leads 56 and 58 in parallel with the resistor 60 and the capacitor 62 is a series circuit including the control windings 64ac, 64bc, and 64cc, of saturable reactors 64a, 64b, and 64c. The saturable reactors are indicated by dotted lines on the drawing.

The transformer 42a has a secondary winding 42as connected to an inductive phase shift circuit network. The secondary winding 42as is tapped as shown. Connected between the tap of transformer 42as and a junction 66a is the primary winding 34ap of transformer 34a. Connected between the junction 66a and one of the end taps of the transformer winding 42as is a resistor 68a and connected between the junction 66a and the other end terminal of transformer winding 42as is the load coil 64aL of the saturable reactor 64a. Similarly connected to the secondary winding 42bs of transformer 42b is an inductive phase shift network comprising the resistor 68b, the primary winding 34cp of transformer 34c and the load coil 64bL.

As previously indicated, the winding 41 of the Scott connected transformers is tapped at 1/3-2/3 ratio to provide a neutral terminal 41b. It is well known that if the voltages of a three phase supply are balanced and equal, the voltage vectors will form an equi-lateral triangle and by elementary geometry, a point which will be equidistant from each of the corners of the triangle will be located one-third the distance along the height from the base of the triangle. Therefore, if the voltages from each of the phases of the supply are of equal magnitude, then the tap 41b will be neutral relative to the voltage vectors of the supply. Further it has been found that the 1/3 tap 41b on the winding 41 of the Scott connected transformers will not only provide a voltage neutral but will also suppress the third harmonic voltage components which otherwise could upset the action of the controller. The use of the terminal 41b as a neutral releases the controller from the dependency of the phase rotation on the supply line. Further, it has been determined that if the transformers 42a and b are of proper size, the secondary winding portion 41s of transformer 41 located between the taps 40a and 41b may be used to supply the inductive phase shift network which includes the resistor 68c, the load winding 64cL of saturable reactor 64b and the primary winding 34bp of transformer 34b.

Connected between lines L2 and L3 in series is a control switch 70 and a pair of relays 30 and 32 which have their actuated windings connected in parallel across lines L2 and L3 and in series with switch 70 so the relays 30 and 32 will be energized whenever the switch 70 is closed. The relay 30 when energized will cause switch contacts 30a, 30b, 30c, and 30d to be closed and the relay 32 when energized will cause the closing of contacts 32a, 32b and 32c.

With the above parts in mind, the operation of the foregoing circuitry will now be described. When the switch 70 is closed, relays 30 and 32 will be energized to cause contacts 30a, b, c, and d to close, and contacts 32a, b and c to close thereby completing the circuits to the thyratrons 23—28 and causing a direct current potential to be applied across the leads 56 and 58. It is to be appreciated that when the switch 54 is in a position to complete a circuit to terminal 54c the build-up of current flow through the control windings 64ac, 64bc and 64cc will be delayed because of the inductive characteristics of the windings. Further, prior to the closure of switch 70 the capacitor 62 will be discharged. When the contacts 30d close, the capacitor 62 will become charged at a rate determined by the RC constants of the circuit which includes the capacitor 62 and the portion of the potentiometer resistor 52. Therefore, upon initial closing of the initiating switch 70, a portion of the current which would otherwise flow through the control windings 64ac, bc and cc, will be diverted to charge capacitor 62, thus creating additional delay in current build-up through windings 64ac, bc and cc. As the charge on the capacitor is increased, an increased current will flow in the control windings 64ac, bc, and cc. This increase in current flow in the saturable reactor control coils will drive the iron cores of the reactors toward saturation to thereby decrease the impedance of the load winding of the saturable reactors. The variation in impedance of the load windings 64aL, bL, and cL will cause a shift in the phase of the output voltage of the transformers 34a, b and c in a manner well known to those skilled in the art and as shown in FIG. 2, wherein the numerals 68, 34 and 64 respectively designate the corresponding elements which are provided with suffixes in the phase shift circuits previously described. It is clearly apparent that as the impedance of winding 64 decreases, the vector of the output voltage provided to the primary winding 34 will be progressively shifted from a large angle of lag towards a small angle of lag with respect to voltage 42as. Correspondingly, the phase angle of the output voltage to the secondary windings 34as, 34bs and 34cs will shift from a great lagging angle to a lesser lagging phase angle to cause the thyratrons 24, 26 and 28 to fire progressively earlier in the half cycle of their anode voltages. The firing of thyratrons 24, 26 and 28 will cause the firing of the ignitrons 15, 17 and 19 respectively in a manner explained in the application mentioned supra. Correspondingly, the firing of the ignitrons 23, 25 and 27 which is under the control of thyratrons 14, 16 and 18 respectively, is also clearly explained in the application supra.

Also, as previously explained in the application supra, the negative bias voltage between the grids and cathodes of the thyratrons controlling ignitrons 15, 17 and 19 is decreased to cause the thyratrons to fire progressively earlier in the positive half cycle of their anode voltages; that is, the normally negative bias between the grid to cathode was made more positive. This is shown graphically in FIG. 3 wherein the curve 72 designates the bias voltage between the grid to cathode voltage. The curve 76 represents the voltage between the cathode and anode and the curve 74 the critical voltage between the grid and cathode; potentials above which will render the tube conductive. It is clearly apparent that application of a D.C. potential of proper polarity will shift curve 72 upward vertically, thus decreasing the negative bias of the thyratron grid towards the critical grid characteristic curve 74.

As curve 72 shifts upward vertically, the point 72a will first intersect the curve 74, causing the conduction of the tube to occur at point 76a of curve 76. However, when the D.C. potential which shifts curve 72 is raised a slight additional amount, point 72b will intersect the curve 74, and cause the tube to fire at point 76b. Thus, in terms of the anode voltage of the tube, a sharp change in the instant of firing of the tube occurs to provide a sudden increase in output instead of the smooth change which occurs earlier in the sequence. When the circuitry according to the present invention is utilized, the curve 72 is moved horizontally because of the phase shift action provided by the inductive phase shift circuit including the saturable reactors 64a, b and c. It will be observed that as the curve 72 is moved horizontally, the thyratrons will fire progressively earlier on their anode voltage curve without the sudden change which occurred in the firing of the tubes when the bias was vertically moved. Further, it will be observed that the variation in charging of capacitor 62a may be controlled from a single control, represented by potentiometer 52, instead of the three individual controls which were employed in the application supra.

In the embodiment shown in FIG. 4, like numerals are used to designate like components together with the corresponding functions thereof, as previously described for for the embodiment shown in FIG. 1. In the embodiment shown in FIG. 1, the transformer secondaries 34as, 34bs and 34cs in the grid circuits of tubes 24, 26 and 28 respectively are replaced in FIG. 4 by a circuit network which includes a transformer secondary 134as, 134bs and 134cs and a capacitor charging circuit which includes capacitors 120a, 120b and 120c which are charged from transformer secondaries 122sa, 122sb and 122sc through diodes 124a, 124b and 124c respectively and discharged through resistors 126a, 126b and 126c when the switch contacts 130a, 130b and 130c are closed. The switch contacts 130a, b and c are opened when relay 30 in FIG. 1 is energized as by closing initiating switch 70. The capacitors 38a, 38b and 38c together with resistors 36a, 36b and 36c form a filter network as previously described. The resistors 36a, 36b and 36c additionally act as grid load resistors for the grid charging circuits as will be hereinafter described.

In the phase shift networks the load windings 64a1, 64b1 and 64c1 of the saturable reactors 64a, 64b and 64c as shown in FIG. 1 are respectively replaced by capacitors 128a, 128b and 128c respectively. In the phase shift networks in FIG. 1, variations in the inductances of load windings 64a1, 64b1, and 64c1 caused a variable shift in phase of the voltage output of the secondaries 34as, 34bs and 34cs respectively. In FIG. 4, the capacitors 128, 128b and 128c cause a fixed phase displacement of the output voltage of secondary windings 134as, 134bs and 134cs of transformers 134a, 134b and 134c which have primary windings 134ap, 134bp and 134cp connected in the phase shift circuits.

The circuit in FIG. 1 which includes the control windings 64ac, 64bs and 64cc and the circuit components which control the energization of the control windings 64a, b and c from transformer secondary 40s are replaced in FIG. 4 by an adjustable resistor 132, a control switch 134 which shunts the resistor 132, a primary winding 122p of a transformer 122 and a pair of normally open switch contacts 130d which are closed when relay 30 is energized. The variable resistor 132 and its parallel connected switch 134 are connected in series with the series connected primary winding 122p and switch 130d across the output terminals of transformer secondary 40s. The secondary windings 122sa, 122sb and 122sc of the transformer which includes the primary winding 122p are connected in the grid circuits of tubes 24, 26 and 28 as previously described.

As previously indicated, the circuit including the ignitrons 14—19 which control the flow of current between the motor 10 and lines L₁, L₂ and L₃ is identical for the embodiments shown in FIGS. 1 and 4. Further, the functions performed by the Scott connected transformers 40 and 41 in FIGS. 1 and 4 is identical. The basic difference between the embodiment shown in FIGS. 1 and 4 resides in the control of the signal to grids 24g, 26g and 28g of tubes 24, 26 and 28 respectively. In FIG. 1 the shift in phase of the alternating potential supplied to the grids 24g, 26g and 28g is accomplished by varying the phase angle of the output windings of the phase shift circuits which includes transformers 34a, 34b and 34c. In the embodiment shown in FIG. 4 the phase angle of the phase shift circuits which includes transformers 134a, 134b and 134c is constant and is tuned by resistors 68a, 68b and 68c. In FIG. 4 the voltage wave of the secondary windings 134as, bs and cs of transformers 134, b and c may be represented by the curve 72 in FIG. 3. The voltage wave to grids 24g, 26g and 28g is raised vertically when a progressively increasing positive voltage bias is applied by the charging of capacitors 120a, b and c in series with windings 134as, bs and cs. The vertical displacement of the A.C. voltage wave produces the desired phase ahead action of the thyratron grids. The arrangement whereby the charging rate of the capacitors 120a, 120b and 120c may be varied simultaneously with a single control, i.e., variable resistance 132, constitutes one of the features of the present invention.

Before the initiating switch 70 is closed, relays 30 and 32 are de-energized and switches 30a, 30b, 30c, 130d, 32a, 32b, 32c are open and switches 130a, 130b and 130c are closed. The open switches 30a, b and c and 32a, b and c will prevent the firing of tubes 23—28. The open switch 130d will prevent transformer primary 122p from being energized and the closed switches 130a, b and c will complete the discharge circuit for capacitors 120a, b and c respectively.

When the initiating switch is closed, the relays 30 and 32 will be energized to close switches 30a, b and c, 130d and 32a, b and c and open switches 130a, b and c. The closing of switches 30a, b and c and 32a, b and c will complete the anode circuits to tubes 23—28 so these tubes will conduct when their respective control grids are biased positive. The conduction of tubes 23, 25 and 27 has been previously described. The conduction of tubes 24, 26 and 28 is respectively controlled by the signal from transformer secondary windings 134as, 134bs and 134cs and the charge on capacitors 120a, b and c, as will now be described.

The Scott connected primary windings of transformers 40 and 41 are continuously energized from lines L₁, L₂, and L₃ and therefore the phase shift networks which include the primary windings 134ap, 134bp and 134cp are energized. The secondary windings 134as, 134bs, and 134cs are therefore energized with a voltage that is phase shifted by the primary winding circuits. This phase shifted voltage which is impressed upon the grids of tubes 24, 26 and 28 has a sine shaped voltage wave which leads the sine shaped voltage wave of the anodes of the tubes 24, 26 and 28 by a phase angle which will cause the tubes 24, 26 and 28 to fire late in the half cycle during which the anodes of the respective tubes are positive. In this connection it is to be noted that the manner of connection of the tubes 24—28 and the ignitrons 14—19 to the lines L₁, L₂, and L₃ and the connection of the Scott connected primaries 41 and 42 together with the phase shift networks which are energized thereby will assure proper relative phasing of the voltages applied to the grids and anodes of the tubes 24, 26 and 28 regardless of the phase sequence of the lines L₁, L₂, and L₃. This feature has been previously described in connection with the embodiment shown in FIG. 1. Therefore, when the switch 70 is initially closed, the tubes 24, 26 and 28 will conduct late in the half cycle of their anode voltage waves and cause similar late conduction of ignitrons 15, 17 and 19.

Prior to the closing of switch 70 the capacitors 120a, b and c are discharged. The closing of switch contacts 130d energizes the primary winding 122p, and the opening of contacts 130a, b and c interrupts the discharge circuits to capacitors 120a, b and c. The secondaries 122sa, 122sb and 122sc which are energized by primary winding 122p are connected through the diodes 124a, b and c respectively, to charge the capacitors 120a, b and c with a polarity which will bias the grids of tubes 24, 26 and 28 with a time rate increasing positive bias relative to the cathodes of tubes 24, 26 and 28.

The increasing positive bias of capacitors 120a, b and c is superimposed on the sine shaped voltage signal impressed between the grids and cathodes on tubes 24, 26 and 28 by transformer secondaries 134as, 134bs and 134cs respectively. Thus as shown in FIG. 3 the voltage wave from these secondaries will be raised vertically so the wave intersects the critical grid voltage curve 74 earlier in the positive half cycle of the anode voltage curve 76 so the tubes 24, 26 and 28 will fire progressively earlier in the positive half cycle of their anode voltage as the positive bias provided by capacitors 120a, b and c is increased.

The time rate at which the capacitors 120a, b and c are charged is controlled by the single element or adjustable resistors 132 as will now be explained. As shown in FIG. 4 when switch 134 is open, the adjustable resistor 132 and the primary transformer winding 122p are connected in series across transformer secondary 40s when the switch contacts 130d are closed. When the capacitors 120a, b and c are discharged, as when the switch 130d is initially closed, the circuits of secondary windings 122sa, 122sb and 122sc will have a low impedance and therefore the impedance of the primary winding 122p will be low. As the potential across the capacitors 120a, b and c progressively and exponentially increases, the impedance of the circuits of secondary windings 122sa, 122sb and 122sc progressively increases due to the blocking action of the capacitor to D.C. current flow thereby causing the impedance of the primary 122p to correspondingly progressively increase.

The total impedance of the circuit of the primary winding 122p primarily is the resultant vector sum of the resistance of adjustable resistor 132 and the impedance of the primary winding 122p. The value of the resistance of resistor 132 is adjustable and the value of the impedance of primary 122p varies proportionately with the exponential variation of potential across capacitors 120a, 120b and 120c. Therefore the impedance of the circuit including the primary winding 122p will vary exponentially and proportionately with the charge across the capacitors 120a, b and c and proportionately with the value of the resistance of resistor 132 and adjustment of the resistor 132 will cause a corresponding change in the charging rate of capacitors 120a, b and c.

In view of the above it is not believed necessary to further elaborate how the charging rates of capacitors 120a, b and c is controlled by the single adjustable resistor 132. Also, in view of the foregoing discussion, it is clearly apparent closure of switch 134 will short the resistor 132 and thus decrease the impedance of the circuit to primary 122p. This will permit the capacitors 120a, b and c to charge rapidly upon the closure of switch contacts 130d and effectively defeat the delayed firing of the ignitron tubes 14—19 as heretofore described.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit for supplying three phase power to a load from a three phase power line, said load device having a plurality of input terminals, the combination comprising; two banks of ignitron tubes connected between said line and the input terminals to provide going and return paths for current through the load, energizable adjustable phase shift means connected in circuit with the ignitor electrodes of the ignitrons of one of said banks for initiating the conduction periods of such ignitrons, means arranged to energize the phase shift means in predetermined phase relation to the powerline voltage independently of the voltage phase rotation of the powerline, said means including a pair of transformers having their primary windings connected across the three phase power line with a Scott connection, and means connected in circuit respectively between the input terminals and the ignitor electrodes of the ignitrons of the other of said two banks of ignitron tubes operative to automatically initiate conduction of the ignitrons in the other bank of said two banks of ignitron tubes in response to an accumulation of charge on the input terminals.

2. The combination as recited in claim 1 wherein the primary windings are connected in circuit with the primary windings of a pair of additional transformers which have their secondary windings arranged to energize two of said phase shift means.

3. The combination as recited in claim 2 wherein each of the phase shift means is controlled by a saturable reactor.

4. The combination as recited in claim 3 wherein the saturable reactor in each of the phase shift means is controlled by a single common control.

5. The combination as recited in claim 4 wherein the single control for the saturable reactors includes a capacitor and a means for varying the charging of the capacitor during the initial current flow from the line to the load whereby the current flow to the load is gradually increased over a predetermined time period when the load is initially energized.

6. The combination as recited in claim 16 wherein the switches in the other of said two banks of electronic switches have their control electrodes connected in circuit with a means which is responsive to the voltages across the input terminals of the motor so the switches in the said other of said two banks of electronic switches provide return paths for current flowing through the motor from said source through the switches in the said one of said two banks of electronic switches.

7. The combination as recited in claim 14 wherein each of the saturable reactors have a control winding and wherein all of the control windings are connected in a series circuit.

8. The combination as set forth in claim 7 wherein the current flow through the control windings is responsive to the charge on a capacitor.

9. The combination as set forth in claim 8 wherein the charge on the capacitor is progressively increased during the initial few cycles of the voltage wave of the source when the source is initially connected through the electronic switches to supply the motor.

10. The combination as recited in claim 2 wherein the phase shift networks energized by the Scott connected transformers have an output with a means connected to said output for impressing a progressively increasing positive voltage bias on the output during the initial energization of the load.

11. The combination as recited in claim 1 wherein the Scott connected primary windings are arranged to energize three individual phase shift networks each having an output including three individual capacitive circuits each of which is connected to one of the outputs for impressing a progressively increasing positive bias to said output during the initial energization of the load and wherein the rate of increase of the positive bias of all of said capacitive circuits is controlled by a single element.

12. The combination as set forth in claim 15 wherein each of the phase shift networks has an output winding connected to a control electrode of an electronic switch to impress a sine shaped voltage wave on the control electrode and wherein a capacitive means is provided for impressing a progressively increasing positive bias on said control electrode during the initial energization of the load.

13. The combination as recited in claim 12 wherein the capacitive means includes three individual capacitive circuits each having individual charging circuits and wherein all of the charging circuits are controlled by a single element.

14. The combination as recited in claim 13 wherein the capacitive charging circuits each includes a secondary winding of a transformer which has a single primary winding and wherein the secondary windings are each connected to a capacitor and wherein the single primary winding is connected in a series circuit with a variable resistance element and a source of alternating current whereby current flow through the primary winding is varied by the resistance and the direct current potential developed across the capacitors by the secondaries.

15. The combination as recited in claim 2 wherein one of the primary windings of the Scott connected transformers has a center tap thereby dividing the primary winding into two sections each having a free end terminal and the other primary winding has a tap dividing the other winding into one-third and two-third sections each having an end terminal and wherein the end terminal of the one-third section is connected to the center tap of the said one winding and the free end terminals of the two-third section and the said two sections are connected to the three phase power line and wherein a pair of transformers each have a primary winding connected between the free end terminals of said two sections and the tap of the said other winding and a secondary winding in circuit with a pair of said phase shift means and the one-third section is center tapped and connected in circuit with another of said phase shift means.

16. In a control circuit for supplying power from a three phase source to a three phase load wherein the load has at least three input terminals, the combination comprising; two banks of electronic switches each having a control electrode and a pair of main electrodes connected between the source and the input terminals to provide going and return paths for current flowing through the load from the source, an adjustable phase shift means connected in circuit with the control electrodes of each of the switches in at least one of said two banks of switches, said phase shift means being energizable for initiating the conduction of the switches in the said one bank, and means including Scott connected transformer windings connected to the source for energizing the phase shift means in a predetermined phase relation to the voltage of the source and independently of the voltage phase rotation of the source.

17. The combination as recited in claim 15 wherein the Scott connected transformer windings includes a main transformer winding having a center tap and a second winding having one end terminal connected to the center tap of the main winding having an intermediate tap dividing the second winding into two portions one of which is directly connected to directly energize the phase shift means connected with one of the control electrodes of the electronic switch in the said one bank of switches.

18. The combination as recited in claim 16 wherein the center tap on the main transformer winding divides the winding into two sections each of which is transformer connected to energize a phase shift means connected with the control electrodes of two other electronic switches in the said one bank of switches.

19. The combination as recited in claim 17 wherein all of the phase shift means are controlled by a single common element.

20. The combination as recited in claim 18 wherein each of the phase shift means has a winding of a saturable reactor in circuit therewith and all of the reactors are responsive to the control of the single common element.

References Cited in the file of this patent

UNITED STATES PATENTS 2,771,574   Welter _____ Nov. 20, 1956